UNITED STATES PATENT OFFICE.

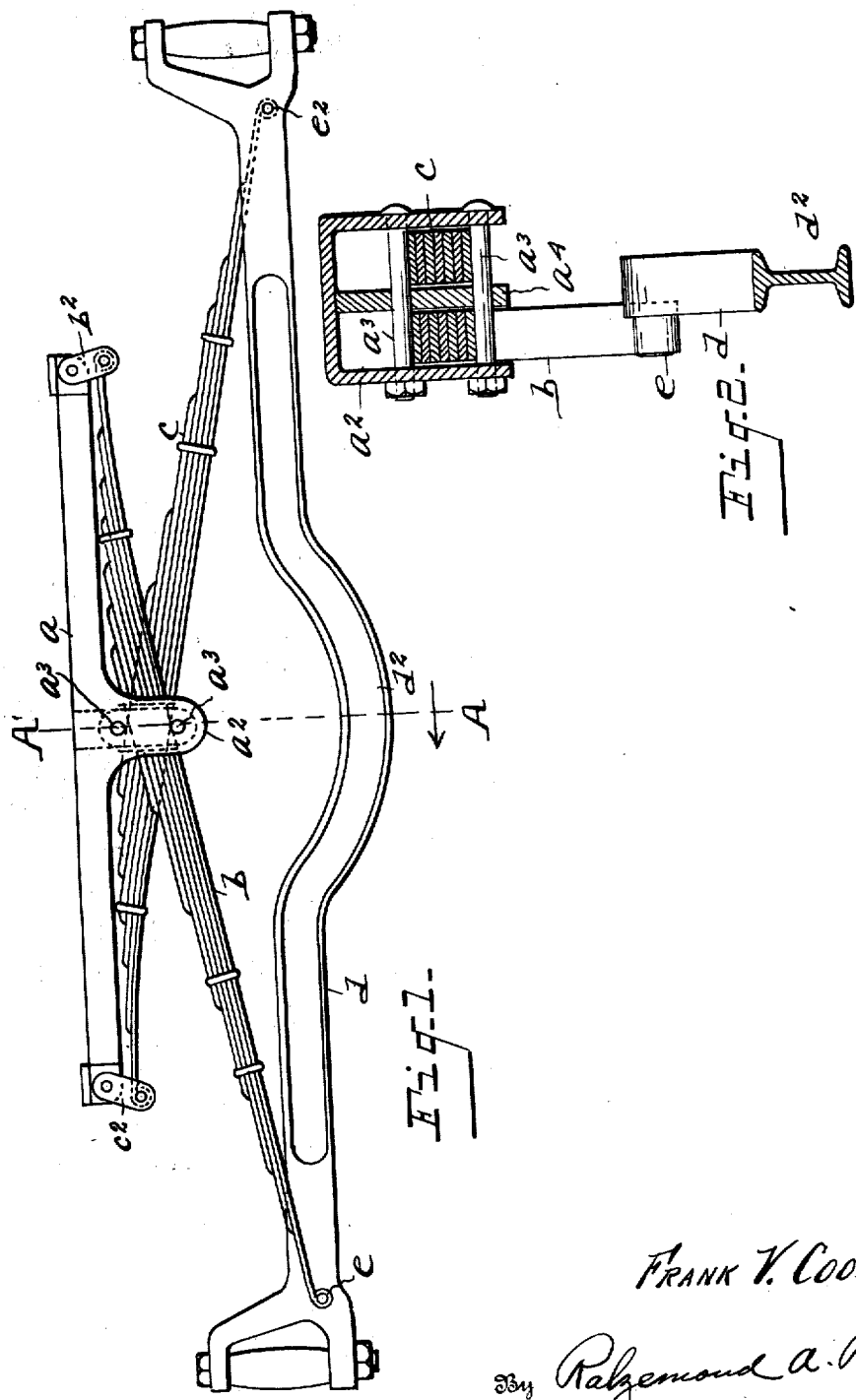
F. V. COOKE.
VEHICLE SPRING.
APPLICATION FILED SEPT. 26, 1919.
1,344,792.
Patented June 29, 1920.
Inventor
FRANK V. COOKE.
By Ralzemond A. Parker
Attorney.

FRANK V. COOKE, OF NEW EAGLE, PENNSYLVANIA.

VEHICLE-SPRING.

1,344,792.   Specification of Letters Patent.   Patented June 29, 1920.

Application filed September 26, 1919. Serial No. 326,445.

*To all whom it may concern:*

Be it known that I, FRANK V. COOKE, who am a citizen of the United States, residing at New Eagle, county of Washington, State of Pennsylvania, have invented a certain new and useful Improvement in Vehicle-Springs, and declare the following to be a full, clear, and exact description of the same, such as will enable others skilled in the art to which it pertains to make and use the same, reference being had to the accompanying drawings, which form a part of this specification.

My invention relates to vehicle springs and has for its object to provide an improved spring in which the resilient force is applied advantageously and a compact and convenient construction provided.

I secure this object in the apparatus shown in the accompanying drawings, in which—

Figure 1 is a front elevation of a portion of a vehicle having a spring apparatus embodying my invention secured thereto.

Fig. 2 is a section on the line A—A of Fig. 1.

$a$ is a transverse bar, of the vehicle body or chassis. $a^2$ represents a U-shaped extension from the cross bar $a$, the open portion being downward. This is at the center of the body. $a^3$ are bolts spaced from each other and extending parallel to each other between the two branches of the U-shaped extension $a^2$. $a^4$ is a plate intermediate of the branches of the U-shaped part and parallel thereto.

$d$ is the vehicle axle. This is hollowed out at the center as shown at $d^2$ to make room for the U-shaped extension $a^2$.

$b$ is a leaf spring approximately straight from end to end extending between one of the branches of the U-shaped piece $a^2$, and the center plate $a^4$ and having one end pivoted to the lower ends of a depending swinging link $b^2$. The other end is pivoted at $e$ to a pin extending laterally from the axle near one end thereof. $c$ is a second spring entirely similar to the spring $b$ pivoted at $e^2$ and extending laterally to the other end of the axle $d$ and extending through the U-shaped piece $a^2$ between the plate $a^4$ and the other branch of the U-shaped part and similarly pivoted to the lower end of a depending swinging link $c^2$.

The springs $b$ and $c$ are loosely embraced by the pins $a^3$ which in connection with the U-shaped piece form a clamp for securing said springs and constraining their relative longitudinal movement.

While it is preferable to secure both of the upper ends of the springs $b$ and $c$ to swinging links, as shown, the apparatus will operate to perform its function if only one end of a spring is so pivoted or if one or both of the upper ends of the springs are allowed to slide through a socket, as is done with reference to cantaliver constructions of the rear springs.

The above-described construction secures three points of resilient constraint to the movement of the body and great freedom of spring action.

The spring is shown connected to a front axle, in which case the lower ends would be secured near the center of gravity of the steering knuckle.

The upper bolt $a^3$ forms a pivotal support at the center and the springs are secured so as to provide an angular freedom of movement, or pivotal action, at each end. I use the word "pivotal" as co-extensive with its functional implication.

Claims:

1. The combination of a vehicle body, an axle, a spring pivoted to one side of the body and to the end of the axle farthest from said side, a second spring pivoted to the other side of the body and to the other end of said axle, a forked member depending from said body adapted to embrace said springs in such a manner as to permit movement of the springs longitudinally, but to restrain movement laterally and vertically within said forked member, said forked member adapted to form an upper fulcrum support for said springs.

2. The combination of a vehicle body, an axle, a spring pivoted to one side of the body and to the end of the axle farthest from said side, a second spring pivoted to the other side of the body and to the other end of said axle, a forked member depending from the body adapted to embrace the intermediate portions of said springs so as to form a fulcrum therefor, and so embracing said springs as to permit relative movement of the body and springs longitudinally of the springs but to prevent lateral movement of the springs.

3. The combination of a vehicle body, an axle, a spring pivoted to one side of the body and to the end of the axle farthest from said side, a second spring pivoted at the other side of the body and to the other end of the axle, a forked member depending from the body in such a manner as to embrace said springs and prevent lateral distortion thereof, pins carried transversely of said forked member above and below said springs embracing said springs in such a manner as to restrain the vertical movement of said springs within said forked member but to permit the longitudinal movement therein.

4. The combination of a vehicle body, an axle, a spring pivoted to one side of the body and to the end of the axle farthest from said side, a second spring pivoted at the other side of the body and to the other end of the axle, a forked member comprising a series of parallel forks depending from said body adapted to individually embrace said springs in such a manner as to prevent lateral distortion thereof but to permit free longitudinal movement of said springs within said forked member, a pin extending transversely through the forks of said depending member above said springs adapted to serve as a fulcrum therefor, a second pin extending transversely through the forks of said depending member below said springs in such manner as to restrain vertical movement of said springs within said forked member but permitting the longitudinal movement of said springs therein.

In testimony whereof I sign this specification.

FRANK V. COOKE.